(12) United States Patent
Abernethy

(10) Patent No.: US 8,739,317 B2
(45) Date of Patent: Jun. 3, 2014

(54) REBOUND-DAMPENING HEADGEAR LINERS WITH POSITIONING FEATURE

(76) Inventor: Patrick Abernethy, Medford, OR (US)

(*) Notice: Subject to any disclaimer, the term of this patent is extended or adjusted under 35 U.S.C. 154(b) by 345 days.

(21) Appl. No.: 13/023,440

(22) Filed: Feb. 8, 2011

(65) Prior Publication Data
US 2011/0252544 A1 Oct. 20, 2011

Related U.S. Application Data

(60) Provisional application No. 61/325,707, filed on Apr. 19, 2010.

(51) Int. Cl.
A42B 3/00 (2006.01)
A42B 3/12 (2006.01)
A43B 13/20 (2006.01)
F16F 13/00 (2006.01)

(52) U.S. Cl.
CPC .................. *A42B 3/121* (2013.01); *A43B 13/20* (2013.01); *F16F 13/002* (2013.01)
USPC .................. 2/413; 2/410; 2/411; 2/6.6; 36/29

(58) Field of Classification Search
CPC ........ A42B 3/21; A42B 3/128; A43B 13/189; F16F 13/002
USPC ............. 2/413, 421, 414, 410, 411, 425, 423, 2/417, 428, 6.1, DIG. 10, DIG. 3; 36/44, 36/29, 3 B
See application file for complete search history.

(56) References Cited

U.S. PATENT DOCUMENTS

| | | | |
|---|---|---|---|
| 3,761,959 A * | 10/1973 | Dunning | 2/413 |
| 4,035,846 A | 7/1977 | Jencks | |
| 4,038,700 A | 8/1977 | Gyory | |
| 4,085,526 A * | 4/1978 | Hemmer | 36/59 R |
| 4,287,613 A | 9/1981 | Schulz | |
| 4,354,284 A * | 10/1982 | Gooding | 2/413 |
| 4,370,754 A | 2/1983 | Donzis | |
| 4,375,108 A | 3/1983 | Gooding | |
| 4,566,137 A * | 1/1986 | Gooding | 2/413 |
| 4,853,980 A * | 8/1989 | Zarotti | 2/413 |
| 5,003,631 A | 4/1991 | Richardson | |

(Continued)

FOREIGN PATENT DOCUMENTS

| EP | 0222029 A1 | 5/1987 |
|---|---|---|
| WO | 86-03655 A2 | 7/1986 |
| WO | 2008-063690 A2 | 5/2008 |

*Primary Examiner* — Danny Worrell
*Assistant Examiner* — Khaled Annis
(74) *Attorney, Agent, or Firm* — Mohr Intellectual Property Law Solutions, PC

(57) ABSTRACT

A liner adapted to be interposed between the interior surface of a protective headgear and a wearer's head includes a plurality of networked fluid cells adapted to distribute and dissipate an impact force to the liner, and/or headgear with which the liner is used, across a larger area of the wearer's head as compared with the impact location, and also to dampen the tendency of the wearer's head from rebounding back from the impact location by transferring fluid through the network from fluid cells at the impact location to those in an opposed region. Discrete fluid cells interspersed among the networked fluid cells maintain the liner and/or the headgear in a predetermined orientation on the wearer's head. Fluid flow within the liner may be restricted or directed by configuring the fluid passageways. A liner may further include means for moving fluid into or out of the fluid cells.

17 Claims, 3 Drawing Sheets

(56) References Cited

U.S. PATENT DOCUMENTS

| | | |
|---|---|---|
| 5,083,320 A | 1/1992 | Halstead |
| 5,259,071 A | 11/1993 | Scott et al. |
| 5,263,203 A | 11/1993 | Kraemer et al. |
| 5,558,395 A * | 9/1996 | Huang .................. 297/199 |
| 5,720,051 A | 2/1998 | Johnson |
| 5,890,232 A | 4/1999 | Park |
| 5,915,819 A * | 6/1999 | Gooding ...................... 36/29 |
| 5,916,664 A * | 6/1999 | Rudy .......................... 428/178 |
| 5,987,783 A * | 11/1999 | Allen et al. ................. 36/127 |
| 6,226,801 B1 * | 5/2001 | Alexander et al. ............ 2/413 |
| 6,560,789 B2 * | 5/2003 | Whalen et al. ................. 2/455 |
| 7,774,866 B2 | 8/2010 | Ferrara |
| 2006/0205303 A1 * | 9/2006 | Nurnberg ...................... 442/123 |
| 2008/0060228 A1 * | 3/2008 | Morgan et al. ................ 36/103 |
| 2009/0056171 A1 * | 3/2009 | Lin ............................. 36/3 B |

\* cited by examiner

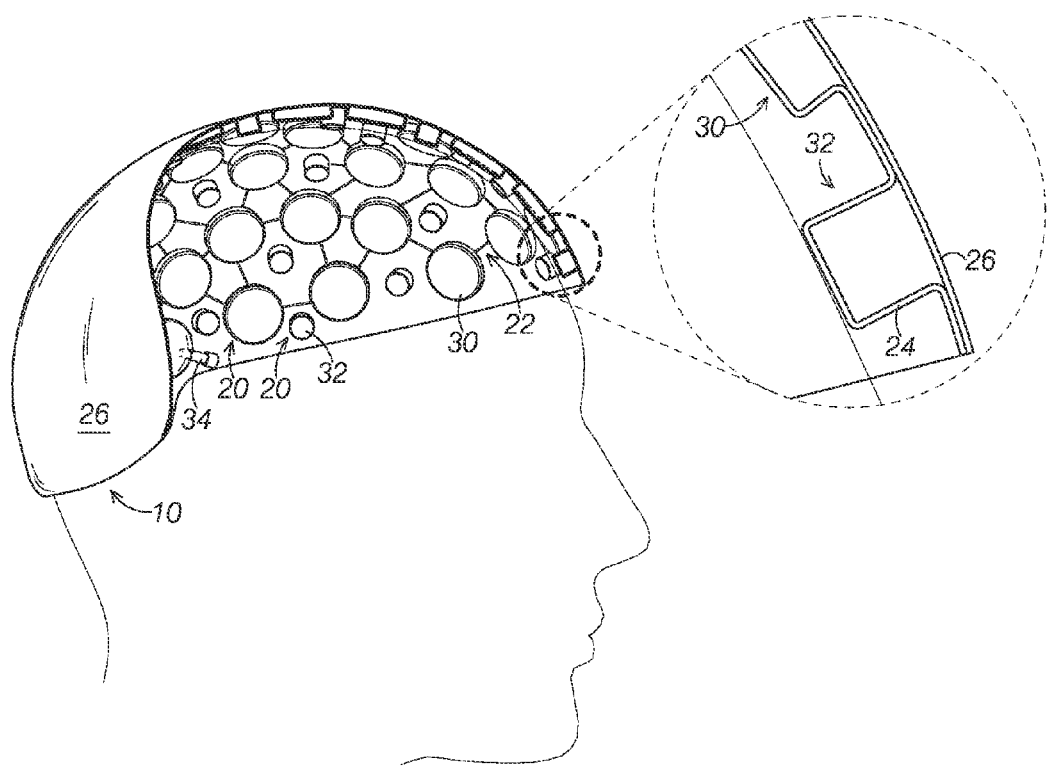
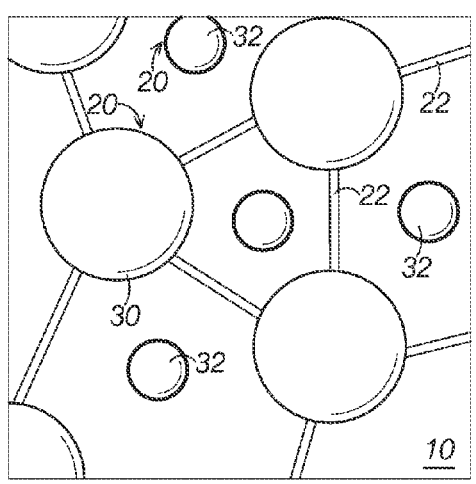 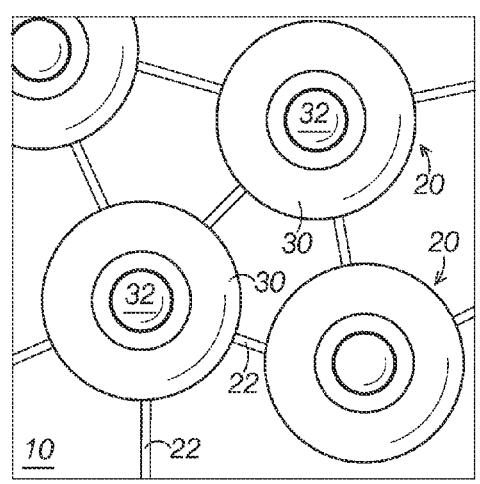
FIG.1
FIG.2
FIG.3

REBOUND-DAMPENING HEADGEAR LINERS WITH POSITIONING FEATURE

RELATED APPLICATION

This application claims the benefit of U.S. Provisional Application No. 61/325,707, filed on Apr. 19, 2010, the entire disclosure of which is incorporated herein by reference for all purposes.

TECHNICAL FIELD

The disclosure relates to personal protective equipment, and in particular to fluid-containing liners adapted for use with a wide variety of designs of protective headgear.

BACKGROUND

Liners are used in conjunction with protective headgear, such as helmets designed for use with various sports and other outdoor activities, primarily to be interposed generally between the interior surface of the headgear and a wearer's head. Most liners are configured for wearer comfort, but some may also or alternatively serve a protective function, such as by including cushions, pads, or other materials to soften or prevent the impact of the wearer's head against the interior of the headgear, such as when the headgear exterior is subject to an impact or other force.

Many head or brain injuries incurred while wearing protective headgear, however, are caused or exacerbated by what may be referred to as a "rebound effect": in the event of a sudden force delivered to the headgear, the wearer's head will tend to initially lurch toward the point of impact and then recoil or rebound from the headgear interior (or cushioning system) away from the point of impact. In certain instances, it is the energy associated with the rebound effect, sometimes regardless of whether the initial impact is cushioned, that is primarily responsible for the severity of head injuries sustained while wearing headgear.

Headgear liners or protective systems that include a plurality of fluid-filled cushions or chambers may be found, for example, in U.S. Pat. No. 5,720,051, U.S. Pat. No. 4,566,137, U.S. Pat. No. 4,375,108, U.S. Pat. No. 4,370,754, U.S. Pat. No. 4,354,284, and U.S. Pat. No. 4,287,613. In some of these disclosures, the fluid-filled cushions are joined together to allow the flow of fluid from one cushion to an adjoining one, such as to absorb and/or distribute the energy from an impact to the headgear over a large area of the wearer's head. However, none address the rebound effect as explained above. Moreover, although the headgear with which some of these liners are used may employ a chinstrap or other device to orient the headgear on a wearer's head, none of the liners themselves include such a feature. The complete disclosures of the aforementioned publications are hereby incorporated by reference for all purposes.

SUMMARY

Illustrative embodiments of liners adapted for use with headgear, generally in a manner in which the liner is interposed between the interior surface of the headgear and a wearer's head received therein, include a plurality of fluid cells formed from a flexible, fluid-impermeable material, each fluid cell adapted to receive and store fluid, such as air, the plurality of fluid cells further including a group of networked fluid cells which each communicate with at least one other via a fluid passageway, and a group of discrete, non-networked fluid cells interspersed among the networked fluid cells. In such embodiments, when the fluid pressure in the fluid cells is at least a predetermined minimum value, such as equivalent to atmospheric pressure, the discrete fluid cells are configured to position the headgear on a wearer's head and to maintain an initial spaced relationship between the user head and the interior surface of the headgear, and the fluid passageways are configured to equalize fluid pressure across the networked fluid cells of the group responsive to a force delivered thereto, such as to distribute and thereby dissipate such a force over a larger region of the wearer's head than that corresponding to the initial point or location of impact. In such embodiments, the networked, or interconnected, fluid cells are adapted to dampen the tendency of the wearer's head to rebound from an impact location by laterally distributing fluid from the networked cells at or near the impact location (or at or near the portion of the liner corresponding to the impact location on the headgear) to other networked fluid cells that are disposed at one or more locations on the liner that are generally opposed to the impact location.

In some embodiments, the liner is formed from two or more superimposed plies of a flexible, fluid-impermeable material, with the adjacent surfaces thereof being sealed at regions internally of their peripheries to form the fluid cells and passageways. In some embodiments, the fluid cells are arranged in a single layer. In such embodiments, each of the discrete fluid cells may be laterally encompassed by at least one networked cell, or a combination of at least two networked cells and the fluid passageway(s) interconnecting them. In some embodiments, the cross-sectional height of the discrete fluid cells, as defined by the extent to which the discrete fluid cells protrude into the concavity formed by the liner, is greater than that of the networked fluid cells, such as to maintain a spaced relationship between the wearer's head and the headgear, or even between the wearer's head and the networked cells.

In some embodiments, some of the fluid cells may be configured to release fluid responsive to a predetermined threshold fluid pressure, such as by rupturing, by transferring fluid via a passageway or valve configured to only allow fluid transfer once the threshold fluid pressure is reached, and so forth. Some embodiments may include reserve fluid cells that are initially empty, but are configured to accept fluid transferred from other fluid cells responsive to the threshold fluid pressure.

In some embodiments, some of the fluid passageways may be provided with means to restrict fluid flow to a predetermined flow rate, or to establish preferential fluid transfer between certain networked cells, such as cells in opposed regions of the liner, for example to facilitate the rebound-dampening effect of the liner.

The fluid cells in some liners may be completely sealed from the ambient atmosphere, whereas some liner embodiments may be valved, such as by including one or more valve members adapted to allow fluid to flow into or out of one or more fluid cells. Such embodiments may further include pressurizing means for selective fluid movement into or out of the liner, such as by means of an integral or removably attachable pump.

In some embodiments, a liner is attached to the interior surface of a helmet having an impact-resistant exterior surface and adapted to be disposed between the interior surface and a wearer's head. In such embodiments, the liner may be removably positionable within the helmet via a plurality of fasteners, which may optionally be arranged in a configuration defining a predetermined orientation for positioning the liner relative to the helmet.

The concepts and components listed above are clarified with reference to the accompanying drawings and detailed description below.

BRIEF DESCRIPTION OF THE DRAWINGS

FIG. 1 shows a side view of an illustrative embodiment of a headgear liner constructed in accordance with the present disclosure, partially cut away to show the interior surface and a cross-section thereof.

FIG. 2 shows a detail view of a portion of the fluid cell pattern on the interior surface of the headgear liner of FIG. 1.

FIG. 3 shows a detail view of another configuration of a fluid cell pattern of another illustrative embodiment of a headgear liner constructed in accordance with the present disclosure.

DETAILED DESCRIPTION

Figure 4:
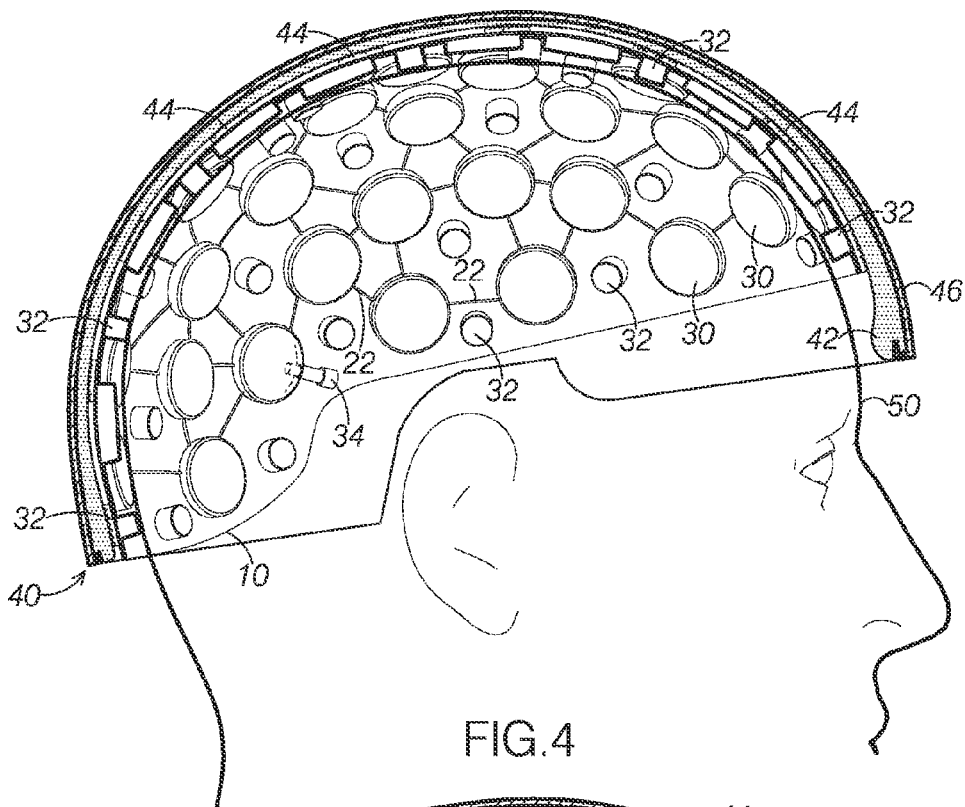
FIG. 4 shows a cross-sectional view of the liner of FIG. 1 incorporated into a helmet that is worn by a user.

The protective liner of the present disclosure may find utility in several areas and design emphasis may shift depending on the application. For example, the liner is generally adapted for use with a protective headgear, such as a helmet, to be interposed between the interior surface of the headgear and a wearer's head received therein. In such embodiments, the liner may take a form appropriate to the interior configuration of the headgear, such as to provide coverage to the areas and/or portion of the wearer's head that the headgear covers or protects. Liners constructed in accordance with this disclosure may, in some embodiments, be suitable for use with other pieces or types of personal protective gear, such as those used in sports or other activities to protect other parts of the wearer's body. Therefore, it is intended that although the illustrative embodiments of a liner described herein may be for use with a specific type of protective helmet or other headgear used in connection with a particular activity, the present invention has application in other areas and may be adapted to such applications without departing from the scope of this disclosure.

Referring initially to FIG. 1, an illustrative embodiment of a liner for protective headgear constructed in accordance with the present disclosure is indicated generally at 10, and is shown to comprise a plurality of fluid cells 20 that are each adapted to receive and store a fluid, such as air, therein, and also a plurality of fluid passageways 22 that join some of the cells 20. The cells 20 and passageways 22 are at least partially formed from a flexible, fluid-impermeable material and are shown to be arranged in a single layer generally defining a shape having a concavity suitable to receive at least a portion of a wearer's head.

In particular, the cells 20 and passageways 22 of the illustrative liner 10 are formed from two superimposed plies 24, 26 of such a material, with the adjacent surfaces thereof sealed at regions internally of their peripheries to form the fluid cells and passageways. Although other configurations having two or more plies are possible, in the liner 10, the "inner ply 24 forms the interior surface of the liner 10 which forms the concavity, and includes the fluid cells 20 and passageways 22, which protrude or project generally into the concavity. The outer" ply 26 forms a generally smooth exterior surface of the liner 10.

As is evident from the shape and context, the liner 10 is configured for use with protective headgear, such as any of various types of helmets suitable for a range of sports and other activities, including football helmets, baseball helmets, motorcycle helmets, bicycle helmets, motocross helmets, skiing and snowboarding helmets, and so forth. Liner 10 may be incorporated into a helmet or other headgear, generally to be interposed between the wearer's head and the helmet's interior. As such, either or both of the exterior and interior surfaces of the liner may be provided with additional components or features as appropriate to the application. For example, the liner in some embodiments may be removably positionable within a helmet or permanently affixed thereto, such as via one or more fastening systems that secure the liner directly to the interior surface of the helmet and/or to a secondary cushioning system on the helmet interior, such as hook-and-loop fasteners, adhesives, snaps, and so forth. Although the liner may be worn with the interior surface (or portions thereof) directly contacting the wearer's head, the interior surface of the liner may optionally be provided with a cover or fabric liner, for example for user comfort, to absorb perspiration, to prevent slipping, and so forth.

The sheet material may be any suitable material having flexibility and fluid-impermeability. In the illustrative liner 10, the material is a plastic, specifically polyethylene. Polyethylene and other plastics typically retain their flexible and impermeable properties through a range of material thickness, making them ideal for production processes that may stretch or otherwise thin the material relative to its starting thickness. For example, a 15-mil sheet of polyethylene that was used to form a prototype liner, having a fluid cell configuration similar to that shown in FIG. 1, thinned to approximately 6 mils through the production process used to form the liner. However, a wide variety of sheet materials, combinations of two or more materials, may be used, as suitable to the application, production method, and so forth. The selection of the material (and characteristics of the chosen material, such as thickness) may optionally depend, to some extent, on the fluid (or fluids) used with the fluid cells of the liner. In the illustrative embodiments discussed and shown herein, the fluid is ambient or pressurized air, but different gases or gas mixtures, or liquids, or other fluid mixtures, may be used. The material (or materials) may also be selected based on the material's yield strength, the production process, and so forth. For an example of the former, in some embodiments, the material and/or its characteristics (such as thickness) may be selected in order to tear or otherwise fail upon being subjected to a predetermined fluid pressure or other force, such as may result from an impact or collision.

As evident from FIG. 1, the plurality of fluid cells 20 is shown to include two types: those that are interconnected by fluid passageways 22, and those that are not. In other words, some of the fluid cells 20 are networked and form one or more groups of networked fluid cells, whereas some of the fluid cells 20 are discrete, or separate from and unconnected to other fluid cells. As such, cells of the former type are referred to herein as networked fluid cells (or networked cells) 30, and the latter type as discrete fluid cells (or discrete cells) 32. As explained in greater detail below, when the fluid cells are at least partially filled with fluid, or in other words when the fluid pressure in the fluid cells is at least a predetermined minimum value, the discrete fluid cells 32 function to properly position and/or orient the headgear on the wearer's head, and the fluid passageways 22 equalize and transfer the fluid pressure across the networked fluid cells 30 of a group responsive to a force delivered thereto, such as may result from an impact to the exterior surface of the headgear with which the liner is used. In the prototype liner mentioned above, the predetermined minimum value of the air pressure in both the networked and the discrete fluid cells is substantially equivalent to atmospheric pressure.

For simplicity, the networked fluid cells 30 of the illustrative liner 10 are shown to form one group of networked cells; in other words, each of the networked fluid cells 30 of liner 10 is interconnected, via one or more intermediate fluid passageways 22 (and possibly via one or more intermediate networked cells), to each other networked cell of the liner. However, other embodiments may include two or more separate groups of networked cells.

As FIG. 2 shows, networked fluid cells 30 extend in a hub-and-spoke arrangement across the liner. As FIGS. 2-7 shows, networked fluid cells 30 define hubs in the hub-and-spoke arrangement. Fluid passageways 22 elongatedly extend between fluid cells 30 to define spokes in the hub-and-spoke arrangement. As FIGS. 2-7 illustrates, each elongate fluid passageway 22 spoke interconnects two spaced networked fluid cell 30 hubs. The networked fluid cells and the elongate fluid passageways cooperate to equalize fluid pressure across the spaced networked fluid cells responsive to a force delivered to one or more of the networked fluid cells by communicating fluid through the elongate fluid passageways between the group of networked fluid cells.

The discrete fluid cells 32 are interspersed among the networked fluid cells 30. In the illustrative embodiment in which the fluid cells 20 of the liner 10 are arranged in a single layer, "interspersed" indicates that each discrete fluid cell 32 is laterally encompassed by at least one networked fluid cell or by a combination of two (or more) networked fluid cells and the one (or more) fluid passageways connecting them, as is perhaps best illustrated in FIG. 2, which shows a detail view of some of the fluid cells 20 formed by the inner ply 24 of the liner 10.

In the illustrative liner of FIGS. 1 and 2, all of the fluid cells 20 (both the networked cells 30 and the discrete cells 32) are shown to have a substantially constant, substantially round cross-section as they protrude inward; in other words, the fluid cells are substantially cylindrical in shape. Further, the networked and discrete cells are all shown to be substantially the same size as others of the same type, with the diameter of the networked cells greater than that of the discrete cells. In particular, in an illustrative prototype example having a fluid cell configuration similar to that shown in FIGS. 1 and 2, the networked fluid cells have a diameter of approximately 30 mm, and the discrete cells have a diameter of approximately 12 m.

Of course, the three-dimensional shape of the fl id cells may be considered to be somewhat of a function of whether the cell contains any fluid, and/or the fluid pressure therein. Although not required to all embodiments, in the illustrative embodiments shown and discussed herein it is assumed that the fluid cells each contain air that is approximately the same or greater than atmospheric pressure, which is generally sufficient to inflate the fluid cells to initially adopt the shapes (or shapes) discussed herein.

The fluid passageways may assume any suitable shape and cross-sectional size. In FIGS. 1 and 2, the fluid passageways 22 are each shown to have a much smaller cross-section than the fluid cells, and to describe a generally straight pathway between the fluid cells they interconnect. However, as explained in further detail herein, differently-sized and configured passageways may be incorporated into a liner, for example to facilitate or restrict fluid flow between or among certain fluid cells.

The shapes, dimensions, dimension ratio, and other characteristics of the fluid cells and fluid passageways shown in FIGS. 1 and 2 are not required to all embodiments. For example, alternate configurations may include a range of differently-sized networked and/or discrete cells, differently-shaped fluid cells, and so forth. One alternate configuration is shown in FIG. 3, in which the networked cells assume a ring shape, with each networked cell 30 encompassing a discrete cell 32. In some liner embodiments, the fluid cells may be arranged in different configurations, for example in different areas of the liner. Indeed, a wide range of fluid cell dimensions, shapes, network configurations, and interspersed patterns may be employed for different activities, different levels of fit, comfort, energy impact absorption, method of manufacture, and so forth.

In the illustrative liner 10, the discrete fluid cells are not only isolated from other fluid cells, but are sealed from the ambient atmosphere by the material from which they are formed. In some embodiments, in a somewhat similar manner, each group of networked cells, although interconnected by its fluid passageways, may also be sealed from the ambient atmosphere. Such a configuration may be thought of as a completely sealed configuration.

However, although not required to all embodiments, the illustrative liner 10 is shown in FIG. 1 to include a valve member 34 configured to allow movement of fluid into or out of the group of networked fluid cells, such as via transfer of ambient air from the atmosphere or via pressurizing means (not shown) such as attachable pump device. As such, because the discrete cells are sealed, whereas the group of networked cells is valved, the illustrated configuration may be thought of as a partially sealed configuration, or, alternatively, as a valved configuration. Of course, other configurations, or variants of these configurations, are also possible, such as those that include multiple groups of networked cells, some of which are sealed and some of which are valved; those in which some of the discrete cells are sealed whereas other discrete cells are valved, and so forth. Moreover, a valved configuration may include more than one valve per group of networked cells, and so forth.

In a partially or completely sealed configuration, a predetermined amount of fluid, or fluid pressure, may be introduced or otherwise contained in the fluid cells during the production process. For example, in the prototype liner mentioned above, a first ply of polyethylene was vacuum-pressed into a substantially dome-shaped mold that includes a number of depressions and raised areas that collectively define the shapes of the various fluid cells and fluid passageways. The ambient air in the volumes formed by the fluid cell and fluid passageway depressions was sealed into the prototype liner upon the application of a second ply of material applied and adhered to the raised areas of the first ply. Of course, other methods of manufacture may be employed. For example, air (or other fluid) at any desired pressure may be sealed into the fluid cells of the liner by carrying out the manufacturing process described above in a fluid-pressurized chamber.

The valve members, such as valve member 34, may be configured as desired. For example, even if the production process for a liner traps or seals an initial quantity or volume of ambient air in fluid cells that are valved, a valve member such as valve member 34 may allow a user to increase or decrease the fluid pressure in such cells (or in the networked group to which such cells are connected), such as by opening the valve to the ambient atmosphere, by attaching a pressurizing means such as a pump, and so forth. Some manufacturing processes, such as the one outlined above, produce a liner in which the fluid cells are all at least partially filled with fluid or, in other words, in which the fluid pressure in the fluid cells is at least a predetermined minimum value; in others, fluid may need to be introduced into the valved fluid cells prior to use. Some embodiments may be configured to allow the user to adjust the fluid pressure in some or all of the fluid cells to achieve a desired comfort and/or safety level. In some embodiments, a valve member may be designed to vent pressure to the ambient atmosphere automatically responsive to a predetermined threshold fluid pressure, such as in the case of an impact to a piece of protective headgear with which the liner is used.

The fluid pressure in the fluid cells, either as provided during manufacture or as set by a user, is generally less than the maximum fluid pressure that a given cell can contain before rupturing, so that the cell may accept additional fluid displaced from another networked cell, to deform responsive to a force, and so forth.

Referring again to the illustrative liner as shown in FIG. 1, the fluid cells are configured so that, when the fluid cells are at least partially filled with fluid and/or when the fluid pressure therein is at least a predetermined minimum value, the height of the discrete cells 32, as defined, for example, by the extent to which a discrete cell protrudes into the concavity formed by the liner (or alternatively the extent to which a discrete cell projects from the inner ply 24 forming the interior surface of the liner), is greater than that of the networked cells 30. In a sealed configuration, the amount of fluid in each of the discrete cells remains more or less constant through use of the liner, for example unless the material defining a particular discrete cell ruptures. Also, unless the material from which it is formed is distended by some force, the height of a discrete fluid cell also remains constant.

However, the amount of fluid and/or fluid pressure in each of the networked cells may vary, such as if a networked cell is compressed upon the application of some force, in which case the fluid contained therein is transferred to another networked cell or cells in the group in order to equalize the pressure across the group. As such, the height of each networked cell will selectively vary depending on the fluid volume in the group, the pressure applied to a given networked cell in a group, and so forth.

In the aforementioned prototype liner, the height of a discrete fluid cell in a neutral, resting state (that is, when no more that ambient atmospheric pressure, or nominal pressure from resting against a wearer's head, is applied to any of the fluid cells of the liner) is approximately 50 mm, and the height of a networked fluid cell is approximately 30 mm. Although the respective heights may vary among embodiments, the substantially constant, greater height of the discrete cells help to space the wearer's head from the networked cells. This spacing helps to initially position and orient, and maintain proper positioning of, the headgear on the wearer's head during use. The positioning system provided by the discrete fluid cells also helps avoid inadvertent compression of the networked cells due to improper positioning of the headgear on the wearer's head, so as to ensure an even initial fluid distribution across the groups of networked cells of the liner. As explained below, an even initial fluid distribution allows the networked cells to more effectively distribute and dissipate a force, such as due to an impact of the headgear.

Although the range may vary among embodiments, the height of the networked fluid cells of the prototype liner vary between about 5 mm and about 100 ml as when the liner or a portion thereof is in an impacted state in which the fluid cells may be compacted or distended (that is, when one or more forces are applied to one or more networked cells, such as responsive to an impact delivered to the exterior of the headgear with which the liner is used).

Figure 5:
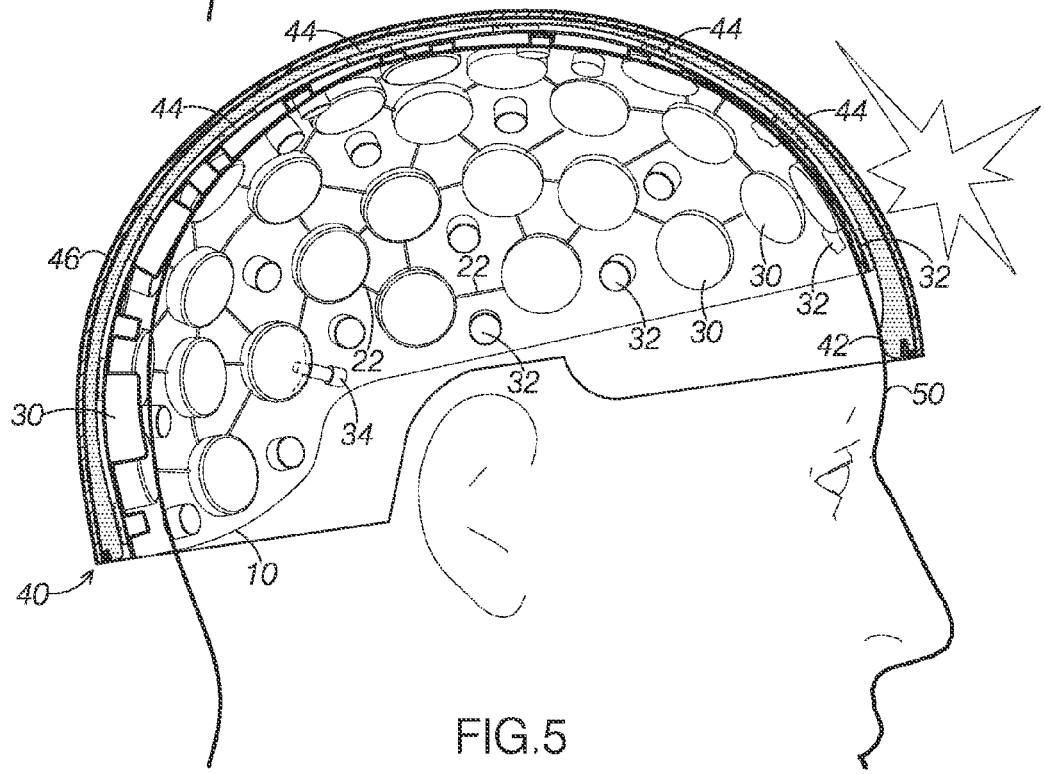
FIG. 5 shows a cross-sectional view similar to that shown in FIG. 4, but in which the user's head has moved forward inside the helmet, such as in response to an impact force delivered to the front exterior surface thereof.

As a simple example illustrating of these concepts, FIGS. 4 and 5 show a liner 10 constructed in accordance with this disclosure and incorporated into a conventional helmet, which is generally indicated at 40, worn on a wearer's head, which is generally indicated at 50. The helmet has an impact-resistant, shell-like exterior surface, and an interior surface defining a concavity adapted to receive a wearer's head therein. As shown, the liner is removably positionable within the helmet to be interposed between the wearer's head and the interior surface 42 of the helmet, such as via a number of fasteners 44 between the exterior surface of the liner and the interior surface 42. Fasteners 44 are shown as hook-and-loop style fasteners, but any suitable manner of fasteners may be used. Moreover, the configuration of the fasteners 44, such as the manner in which the fasteners are disposed on the interior surface of the helmet, may define a predetermined orientation for positioning the liner relative thereto, such as by fore forming a pattern to match up to a corresponding fastener pattern on the exterior surface of the liner.

FIG. 4 represents the liner in a neutral, resting state, in which the discrete fluid cells 32 of the liner are shown to directly contact the wearer's head 50, maintaining correct orientation of the helmet 40 and initially spacing the wearer's head from the interior surface 42 of the helmet. FIG. 5, however, represents the liner in an impacted state, in particular one in which a force is delivered to the front portion of the exterior surface 46 of the helmet, such as if the front portion of the helmet impacts an object.

As noted above, in the event of a sudden force delivered to the helmet, the wearer's head tends to initially lurch toward the point of impact, as shown in FIG. 5, wherein the wearer's head 50 is shown to have moved forward relative to the helmet 40. Responsive to this movement, the fluid cells between the wearer's head and the interior of the helmet are compressed. Specifically, the discrete fluid cells in the portion of the liner between the wearer's head and the front portion of the helmet, which are either in contact with the wearer's head or, due to their height, are encountered by the wearer's head as it moves forward toward the interior surface of the helmet, initially absorb some of the impact energy and decelerate the wearer's head. As the discrete fluid cells are compressed and the wearer's head moves further toward the helmet interior, the wearer's head next encounters the networked cells, which provide further cushioning and deceleration. Depending on the configuration of the discrete cells and the nature of the force, the discrete cells may distend under compression, or rupture or otherwise release fluid. However, the networked fluid cells 30 of the liner are configured to distribute and thereby dissipate the impact force by transferring fluid from the compressed networked cells to others in the group via the fluid passageways 22. As a result, the impact force is distributed over a larger area of the wearer's head compared to that corresponding to the helmet's point of impact.

Additionally, FIG. 5 shows that the networked fluid cells 30 of the portion of the liner opposite to those compressed between the user's head and the helmet (in other words, those to the rear of the wearer's head) are inflated as compared with their neutral state, having accepted fluid transferred from the compressed networked cells in the front portion of the liner, to the point that the inflated networked cells may contact the rear portion of the wearer's head. In this condition, the inflated cells may serve to restrict or even prevent the wearer's head from rebounding from the point of impact, which may in turn reduce or even eliminate the occurrence and/or severity of head or brain injuries that would otherwise result from the rebound effect.

As such, an even initial fluid distribution may ensure an effective fluid transfer among networked cells, such as those that are compressed as a result of an impact force, when the liner in an impacted state. On the other hand, an uneven initial fluid distribution, such as if some cells are compressed and/or distended when the liner is not in an impacted state, may reduce the capacity of some cells to transfer fluid or accept fluid transferred from other cells. As such, the positioning of the liner relative to a wearer's head that is achieved by the discrete fluid cells, in that such spacing may help to avoid inadvertent cell compression due to incorrect orientation in a neutral state, facilitates the liner's ability to dissipate and distributed a force through the networked fluid cells.

The liner 10, as shown in FIGS. 1, 4, and 5, may be thought of as including several more or less continuous regions shaped and configured to protect corresponding portions of a wearer's head, such as a crown, opposed front and back, and opposed right and left regions that are positioned to protect, respectively, those portions of the area of the wearer's head covered by the liner. Of course, other embodiments may assume different shapes, such as that include separate and/or discontinuous regions to protect respective head portions, and/or may have greater or lesser head coverage than as shown with liner 10. Optionally, some embodiments may include more than one layer of fluid cells to protect certain regions.

The liner 10 may be configured to preferentially direct fluid displaced from one region to another responsive to a force, such as an impact force, delivered to some of the networked cells 30. Such preferential fluid transfer may result in faster more direct fluid transfer from certain designated networked cells to other certain designated networked cells, and/or from the networked cells in one region of the liner to those in another specific region, such as from the front region to the rear region. Faster or more direct fluid transfer may in turn ensure that even in sudden impacts, the networked fluid cells preventing or restricting the head from rebounding from the point of impact are inflated quickly, dampening the rebound effect. Further, in circumstances in which the headgear with which the liner is used is subject to a succession of impact forces, preferential fluid transfer may facilitate the quick dissipation of each of such impact forces, even if delivered to different parts of the headgear.

Preferential fluid transfer may be accomplished in a variety of manners. As mentioned above, the networked fluid cells 30 of the illustrative liner 10 are all interconnected, either directly by means of an intermediate fluid passageway or indirectly by means of multiple intermediate passageways and/or other networked cells; in other words, the illustrative liner 10 includes one group of networked cells. Other embodiments may include several networked groups that are separate from each other, such as a first group of networked cells configured specifically to transfer fluid between the front and back regions of the liner and a separate, second group configured specifically to transfer fluid between the left and right regions, and so forth. Such separate networked groups may be formed in a liner consisting of two superimposed plies of material forming a single layer of fluid cells and fluid passageways, a liner formed from three or more plies to create one or more superimposed layers of fluid cells and fluid passageways, and so forth.

Another (additional or alternative) manner in which preferential fluid transfer may be accomplished is via the physical configuration and/or the arrangement of the various fluid passageways that interconnect the networked cells. For a simple example, when all other variables are held constant, a networked cell connected to second via one fluid passageway and to a third via two fluid passageways, all of the same cross-sectional area, will transfer fluid to the second cell at a faster rate than to the third. Similarly, and again when all other variables are held constant, a networked cell connected to a second one via a fluid passageway having a greater cross-section than a fluid passageway connecting it to a third will transfer fluid to the second at a faster rate than to the third. Still other configurations and arrangements of fluid passageways interconnecting networked fluid cells will result in different relative rates of fluid transfer, allowing preferential fluid transfer between certain networked cells even among those in the same group.

Figure 6:
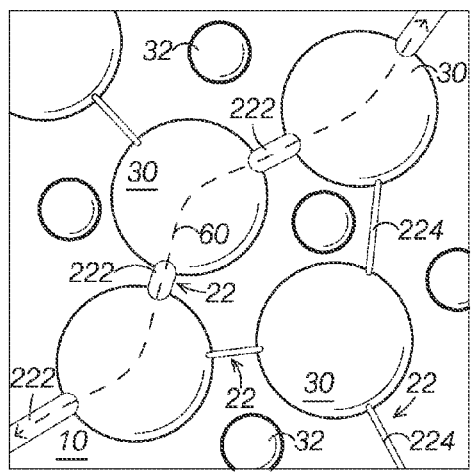
FIG. 6 shows a detail view of a configuration of a fluid cell pattern of another illustrative embodiment of a headgear liner constructed in accordance with the present disclosure, in which some of the fluid passageways are adapted to provide a preferential fluid flow pathway.

FIG. 6 illustrates this concept in a partial view of a liner 10 having an example configuration of fluid cells 20 and passageways 22. In FIG. 6, the fluid cell configuration of the liner similar to those shown in FIGS. 1-5, in that it includes a number of networked fluid cells 30 interconnected by the fluid passageways 22, and a number of discrete fluid cells 32 interspersed among the networked fluid cells. However, in FIG. 6, some of the fluid passageways, indicated at 222, are shown to have a larger cross-section as compared with others, such as indicated at 224. As mentioned above, all other variables held constant, fluid will flow through passageways 222 at a greater rate than through passageways 224. Of course, some fluid will flow through the smaller cross-section passageways 222, but at a comparatively slower rate. As such, this configuration provides a fluid transfer pathway generally defined by the larger fluid passageways 222 and the networked fluid cells they connect, and indicated in FIG. 6 at 60. The fluid transfer pathway 60 indicates the direction of preferred fluid flow through the networked cells in the represented portion of liner 10.

Thus, in a liner that includes several regions, such as a crown, opposed front and back, and opposed left and right regions shaped, respectively, to protect the crown, front, back, left, and right portions of a wearer's head, the networked fluid cells may be adapted to preferentially direct fluid from one or more of the front, back, left, and right regions toward the opposed region responsive to a force delivered thereto, such as to achieve a faster fluid transfer in order to dampen or even prevent the rebound effect resulting from a sudden impact to a particular portion of the headgear. Of course, preferential fluid transfer means may be used to direct transferred fluid from certain networked cells to others in the same group in liners that may not include defined regions.

Preferential fluid transfer may be thought of, conversely, as being accomplished by selectively restricting some fluid transfer, such as by configuring some of the fluid passageways to restrict the rate at which fluid is transferred. All other variables held constant, fluid will flow along the path of least resistance; thus, between a fluid passageway incorporating some fluid restricting means and one that does not, preferential fluid transfer is accomplished via the latter.

Fluid restricting means may optionally be used other than to achieve preferential fluid transfer, however. For example, the energy absorbing capacity of a networked cell may be facilitated by limiting or otherwise restricting the rate at which fluid may be displaced from it. Slowing the transfer of fluid from a networked cell may increase the energy absorbed by the cell due to more compression energy and/or time required to move the fluid through the fluid restricting means.

Figure 7:
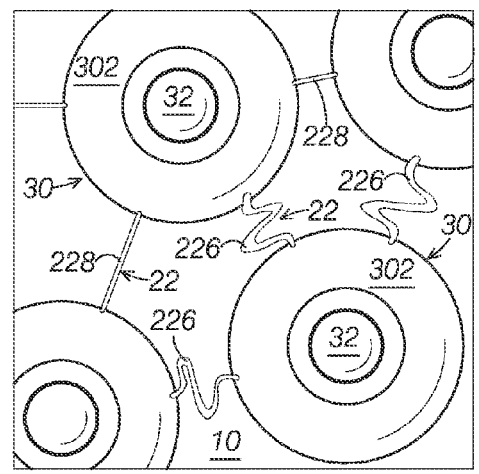
FIG. 7 shows a detail view of a configuration of a fluid cell pattern of another illustrative embodiment of a headgear liner constructed in accordance with the present disclosure, in which some of the fluid passageways include fluid restricting means.

A variety of fluid restricting means with different levels of restricting capacity may be incorporated into the fluid passageways 22 of liner 10, such as baffles, narrowed fluid passageways or portions thereof, plugs, portions of increased friction, valves, such as one-way valves, circuitous passageways, and so forth. FIG. 7 illustrates this concept in a partial view of a liner 10 having another example configuration of fluid cells 20 and passageways 22. In FIG. 7, the fluid cell configuration of the liner is similar to those shown in FIGS. 1-6, in that it includes a number of networked fluid cells 30 interconnected by the fluid passageways 22, and a number of discrete fluid cells 32 interspersed among the networked fluid cells. In the configuration shown in FIG. 7, the networked cells 30 are ring-shaped, and each of the discrete cells 32 is, respectively, encompassed thereby. However, some of the fluid passageways, particularly those connecting the networked fluid cell indicated at 302 to its neighboring networked fluid cells, are each shown to describe a circuitous, S-shaped pathway between fluid cell 302 and its neighboring networked cells; such passageways are indicated at 226. Other fluid passageways, such as indicated at 228, describe straight, direct pathways between the fluid cells they interconnect. Comparatively speaking, the S-shaped passageways 228 facilitate the energy-absorbing capacity of fluid cell 302 due to the greater amount of force required to move the fluid contained in the cell through the passageways 228 to its neighboring networked cells.

Depending on the configuration, the fluid restricting means incorporated into a liner may be adapted only to allow fluid transfer responsive to a predetermined threshold pressure. One example of this is by use of a pressure-responsive valve member (such as a one-way valve) disposed in a fluid passageway connecting a first fluid cell to a second. Such a valve member may be configured to allow fluid to be transferred, for example from the first cell to the second, only when the fluid pressure in the first cell reaches a predetermined threshold value.

Use of such a valve member or other such means is one way in which the fluid cells in a liner may be configured to release fluid responsive to a predetermined threshold fluid pressure. In some situations, such as when an impact force to the headgear is very sudden and of great magnitude, the fluid in some of the fluid cells absorbing the impact energy may reach a very high pressure if the fluid is not able to be rapidly transferred to neighboring networked cells. Rapid fluid transfer may be facilitated by an initial even fluid distribution, as mentioned above. However, some of the fluid cells in some liner embodiments may be provided with means in which the fluid contained therein may be released responsive to a predetermined threshold fluid pressure, in some cases in addition to normal fluid transfer, such as from one networked cell to others in a group. A simple method, of course, is by using a material designed to rupture responsive to such a fluid pressure, for example to release the contained fluid to the atmosphere. Arranging the fluid cells to be spaced away from each other, such as in the illustrative liners 10 shown and described herein, allows a volume of void space between a wearer's head and the helmet interior into which fluid may be released in the case of material rupture. However, in embodiments in which the liner is intended for repeated use, it may be preferable to employ means of relieving high fluid pressure in a manner that avoids cell rupture, such as by incorporating the aforementioned valve members.

Optionally, although not shown in the drawings, a liner may include one or more reserve fluid cells adapted to accept fluid released from a fluid cell responsive to a predetermined threshold fluid pressure (such as via a one-way valve). Such reserve fluid cells may initially be empty of fluid, or contain less fluid (or fluid at a comparatively lower pressure) than as compared to the fluid cells in communication therewith, such as to be able to more quickly accept fluid than if initially containing more fluid (or fluid at a comparatively higher pressure). Some liner embodiments may include a number of different pressure-relief means (in addition to normal fluid transfer, such as among other networked cells of a group), such as some cells that are adapted to rupture responsive to a predetermined threshold fluid pressure, some that are adapted to release fluid to one or more reserve cells, and so forth.

Figure 8:
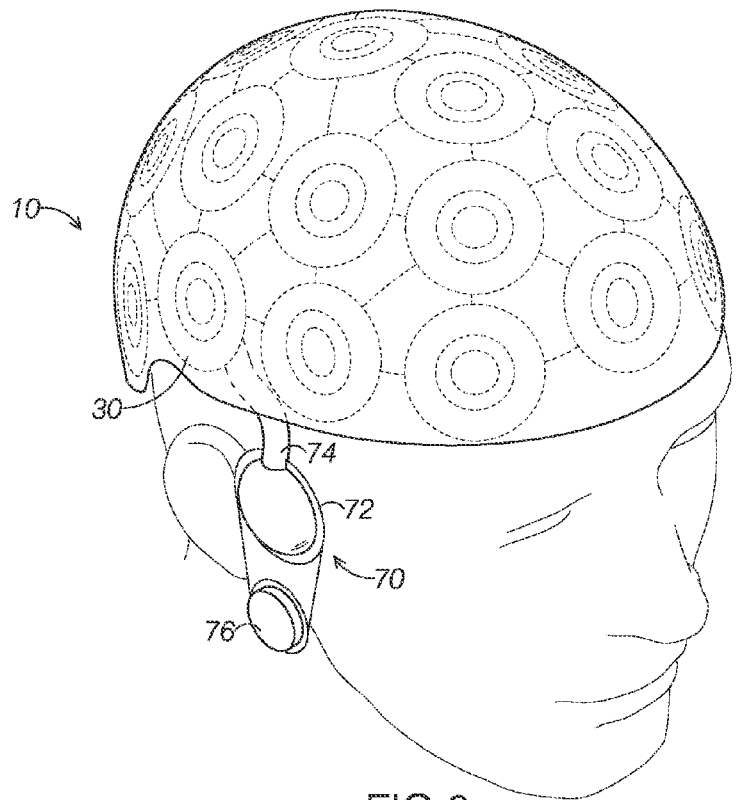
FIG. 8 shows a three-dimensional view of an illustrative embodiment of a headgear liner constructed in accordance with the present disclosure, in which the liner is provided with pressurizing means.

Some liner embodiments may optionally include pressurizing means disposed on the liner for selectively moving fluid into and out of the fluid cells, such as through a valve member (such as valve member 34, as shown in FIG. 1). FIG. 8 shows an illustrative example liner 10 that includes pressurizing means, generally indicated at 70, and shown in the form of a pump mechanism 72 that communicates with a networked fluid cell 30 via a pump channel 74, when actuated via an actuator 76 (shown as a button). The pressurizing means is shown to be plied on the wearer's right side of the liner to descend generally forward of the wearer's ear, but such means may be disposed in any appropriate location (or locations) on the liner.

Further, in the example shown in FIG. 8, the fluid may be air that is moved from the ambient atmosphere into the cells of the liner 10, but, as mentioned above, the fluid in other embodiments may be a different gas or gas mixture, or a liquid or liquid mixture. In such embodiments, the pressurizing means may also communicate with a reserve volume of fluid, such as a reservoir or pressurized tank. Optionally, the pressurizing means may be adapted to selectively pressurize the liner with a variety of different fluids, such as by selectively attaching the pressurizing means to a fluid reservoir or allowing the pressurizing means to draw in ambient air as the fluid.

In embodiments in which the pressurizing means incorporates a pump mechanism, the pump may be integrated into the liner, otherwise secured thereto, or selectively attachable thereto, such as by removably coupling with an integrated valve member incorporated into the liner.

Pressurizing means may allow a user to adjust the fit, comfort, and/or protective capabilities of the liner, such as by pumping different amounts of fluid into one or more fluid cells or groups of networked cells. For example, the more fluid that is pumped into a fluid cell or a group of networked fluid cells, the more such cells expand. As mentioned above, in the illustrated embodiments, the discrete fluid cells generally protrude into the concavity formed by the liner further than the networked cells, such that the discrete fluid cells are generally the fluid cells in contact with the wearer's head. In valved configurations in which some of the discrete fluid cells are provided with a valve, a user may tighten or loosen the fit of the headgear used with the liner by adjusting the fluid pressure or level of such discrete fluid cells.

In valved configurations in which one or more of the groups of the networked fluid cells are provided with a valve, the cells may be expanded to the point at which they contact the wearer's head, so that a tighter fit may be achieved. As mentioned above, however, when the fluid pressure across a group of networked fluid cells is higher, each individual networked cell in the group may have decreased capacity to absorb energy by accepting fluid transferred from others. Thus, depending on the configuration of the fluid cells of a liner, a user may set the fluid pressure(s) at a desired value (or values) to optimize comfort and protection. Further, a user may choose to add or remove fluid during the course of an activity, for example if the user's head expands or contracts due to changing heat and blood flow, such as from different levels of physical exertion.

Although the present invention has been shown and described with reference to the foregoing operational principles and illustrated examples and embodiments, it will be apparent to those skilled in the art that various changes in form and detail may be made without departing from the spirit and scope of the invention. The present invention is intended to embrace all such alternatives, modifications and variances that fall within the scope of the appended claims.

I claim:

1. A liner for protective headgear adapted to be interposed between the interior surface thereof and a wearer's head received therein, the liner comprising:
   a plurality of fluid cells formed from a flexible, fluid-impermeable material, each fluid cell adapted to receive and store fluid therein, the plurality of fluid cells further including:
      a group of networked fluid cells extending in a hub-and-spoke arrangement across the liner, where:
         the networked fluid cells define the hubs in the hub-and-spoke arrangement, the networked fluid cells being spaced from one another;
         elongate fluid passageways define the spokes in the hub-and-spoke arrangement, the elongate fluid passageways interconnecting two networked fluid cells; and
         the networked fluid cells and the elongate fluid passageways cooperate to equalize fluid pressure across the networked fluid cells responsive to a force delivered to a networked fluid cell by communicating fluid through the elongate fluid passageways between the group of networked fluid cells; and
      a group of discrete, non-networked fluid cells encompassed by at least two networked fluid cells and the fluid passageways interconnecting them, wherein the discrete fluid cells are completely separate from the networked fluid cells;
   wherein at least some of the discrete fluid cells position the headgear on a wearer's head and maintain an initial spaced relationship between the user's head and the interior surface of the headgear when the fluid pressure in the networked fluid cells is at least a predetermined minimum value.

2. The liner of claim 1, wherein the fluid cells are arranged in a single layer.

3. The liner of claim 2, wherein each of the group of discrete fluid cells are laterally encompassed either by at least one networked cell or a combination of at least two networked cells and a fluid passageway extending therebetween.

4. The liner of claim 2, wherein the material is formed such that the layer in which the fluid cells are arranged has an exterior side that faces the interior surface of the headgear, and an interior side forming a concavity adapted to receive a user's head;
   wherein the interior side defines a surface from which the fluid cells project; and
   wherein, when the fluid pressure in the fluid cells is at least a predetermined minimum value, the discrete fluid cells project into the concavity from the surface to a greater extent than the networked fluid cells.

5. The liner of claim 1, wherein at least some of the fluid cells are configured to release fluid responsive to a predetermined threshold fluid pressure.

6. The liner of claim 5, wherein such fluid cells are configured to rupture responsive to the predetermined threshold fluid pressure.

7. The liner of claim 5, further including at least one reserve fluid cell communicating with at least one such fluid cell, the reserve fluid cell configured to accept fluid released from the fluid cell responsive to the predetermined threshold fluid pressure.

8. The liner of claim 1, wherein the material is formed such that the liner includes crown, opposed front and back, and opposed left and right regions shaped to protect the respective crown, front, back, left, and right portions of the user's head; and
   wherein the plurality of fluid cells includes at least one group of networked cells adapted to dampen the tendency of the wearer's head from rebounding from a location on the liner in response to a force delivered thereto by distributing fluid from one or more of the front, back, left, and right regions toward the respective one or more opposed regions.

9. The liner of claim 1, wherein the fluid pressure in the plurality of fluid cells is at least the predetermined minimum value.

10. The liner of claim 9, wherein the fluid in at least some of the fluid cells is air.

11. The liner of claim 1, wherein at least some of the fluid passageways include fluid restricting means configured to limit the rate at which fluid is transferred therethrough;
   wherein the fluid restricting means defines a circuitous pathway along at least a portion of the length of the associated fluid passageway.

12. The liner of claim 1, further including pressurizing means disposed on said liner for selectively moving fluid into and out of the plurality of fluid cells.

13. The liner of claim 1, wherein the adjacent surfaces of two superimposed sheets of said material are sealed at regions internally of their peripheries to form the plurality of fluid cells and fluid passageways.

14. The liner of claim 1, wherein:
   a first set of fluid passageways include a fluid restricting means configured to limit the rate at which fluid is transferred through the first set of fluid passageways; and
   a second set of fluid passageways do not include fluid restricting means to preferentially transfer fluid through the second set of fluid passageways.

15. The liner for protective headgear of claim 1, wherein the fluid passageways:
   describe substantially straight extending pathways between spaced networked fluid cells; and
   define a cross-sectional size selected to restrict fluid flow among the networked fluid cells.

16. The liner for protective headgear of claim 1, wherein:
   each cell in the group of networked fluid cells define a first height; and
   each cell in the group of discrete, non-networked cells defines a second height that differs from the first height to define a substantially constant vertical spacing between the networked cells and the wearer's head.

17. A liner for protective headgear adapted to be interposed between the interior surface thereof and a wearer's head received therein, the liner comprising:
  a plurality of spaced fluid cells formed from a flexible, fluid-impermeable material, each fluid cell adapted to receive and store fluid therein, the plurality of fluid cells further including:
    a group of networked fluid cells which each communicate with at least one other spaced networked fluid cell via an elongate fluid passageway extending therebetween, each networked fluid cell defining a distinct, fluid-restrictive wall substantially enclosing the interior of the fluid cell, each wall being initially spaced from the walls of other networked fluid cells; and
    a group of discrete, non-networked fluid cells interspersed among the networked fluid cells;
  wherein:
    the networked cells are ring-shaped and the discrete, non-networked cells are encompassed thereby; and
    when the fluid pressure in the fluid cells is at least a predetermined minimum value, at least some of the discrete fluid cells are configured to extend from the interior surface toward the wearer's head a distance sufficient to abut the wearer's head to position the headgear on a wearer's head and to maintain an initial spaced relationship between the user's head and the interior surface of the headgear, and the fluid passageways are configured to equalize fluid pressure across the networked fluid cells of the group responsive to a force delivered thereto by communicating fluid through the elongate fluid passageways extending between the group of networked fluid cells.

* * * * *